United States Patent [19]

Stahlecker et al.

[11] 3,767,507
[45] Oct. 23, 1973

[54] APPARATUS FOR THE MANUFACTURE OF WORK PIECES CONSTRUCTED AS CUP-LIKE, UPWARDLY OR DOWNWARDLY TAPERING CONTAINERS

[75] Inventors: Hans Stahlecker, Suben; Oskar Karolyi, Erlengarten, both of Germany

[73] Assignee: Firma Michael Horauf Maschinenfabrik, Boll, Germany

[22] Filed: Apr. 11, 1969

[21] Appl. No.: 816,187

[30] Foreign Application Priority Data
Apr. 11, 1968 Germany.................. P 17 78 252.4

[52] U.S. Cl.................. 156/382, 93/36.1, 93/39.2, 93/39.3, 93/59 R, 156/218, 156/273, 156/443, 425/389, 425/393
[51] Int. Cl............................................. B31b 3/00
[58] Field of Search.................... 156/218, 273, 443, 156/69; 93/36.1, 36.5 R, 59 CE, 59 ES, 39.2, 39.3; 264/320, 319; 425/392, 384, 387, 393

[56] References Cited
UNITED STATES PATENTS

| 2,958,898 | 11/1960 | Voumard et al................ 425/393 X |
| 3,065,677 | 11/1962 | Loeser......................... 93/36.5 R X |
| 3,224,239 | 12/1965 | Hansson.......................... 425/387 X |
| 3,257,689 | 6/1966 | Weyer................................ 425/387 |
| 3,272,094 | 9/1966 | Carpenter, Jr................ 93/59 CE X |
| 3,356,552 | 12/1967 | Pearl............................... 156/273 X |
| 3,360,826 | 1/1968 | Lorang........................... 425/392 X |
| 3,383,265 | 5/1968 | Garabedian........................ 156/272 |
| 3,432,887 | 3/1969 | Poux et al............................. 425/387 |
| 3,466,707 | 9/1969 | Click et al........................ 425/392 X |
| 3,547,012 | 12/1970 | Amberg et al................... 156/69 X |

Primary Examiner—Alfred L. Leavitt
Assistant Examiner—David A. Simmons
Attorney—Craig, Antonelli, Stewart and Hill

[57] ABSTRACT

A method and apparatus for manufacturing work pieces, preferably constructed as cup-like tapering containers, whose walls consist of synthetic resinous material, by utilizing flat blanks that are initially wound into approximately cylindrical tubes and are thereupon closed whereafter the thus-obtained tubes are deformed into tapering configuration forming the walls of for example, cup-like containers.

12 Claims, 22 Drawing Figures

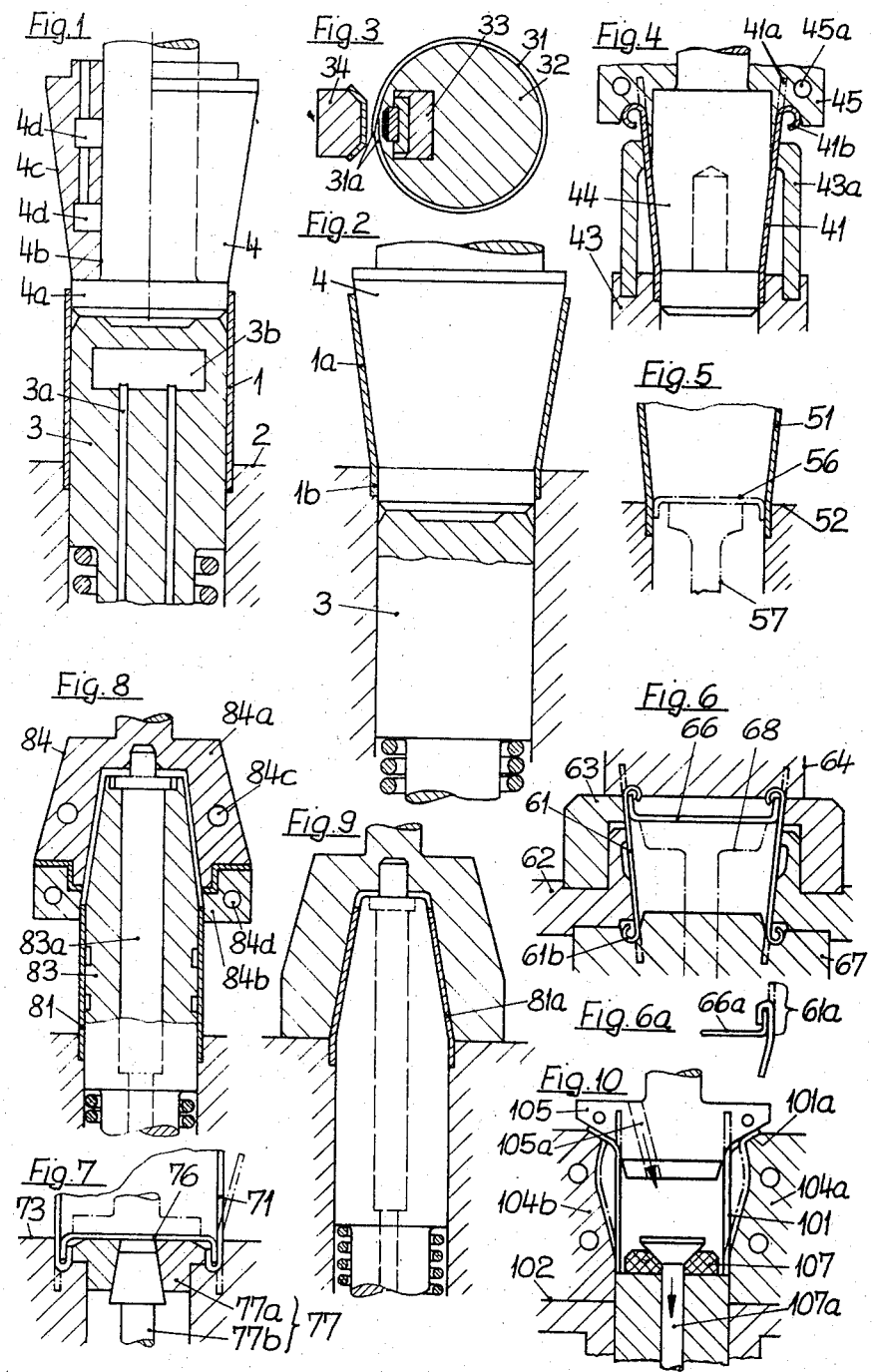

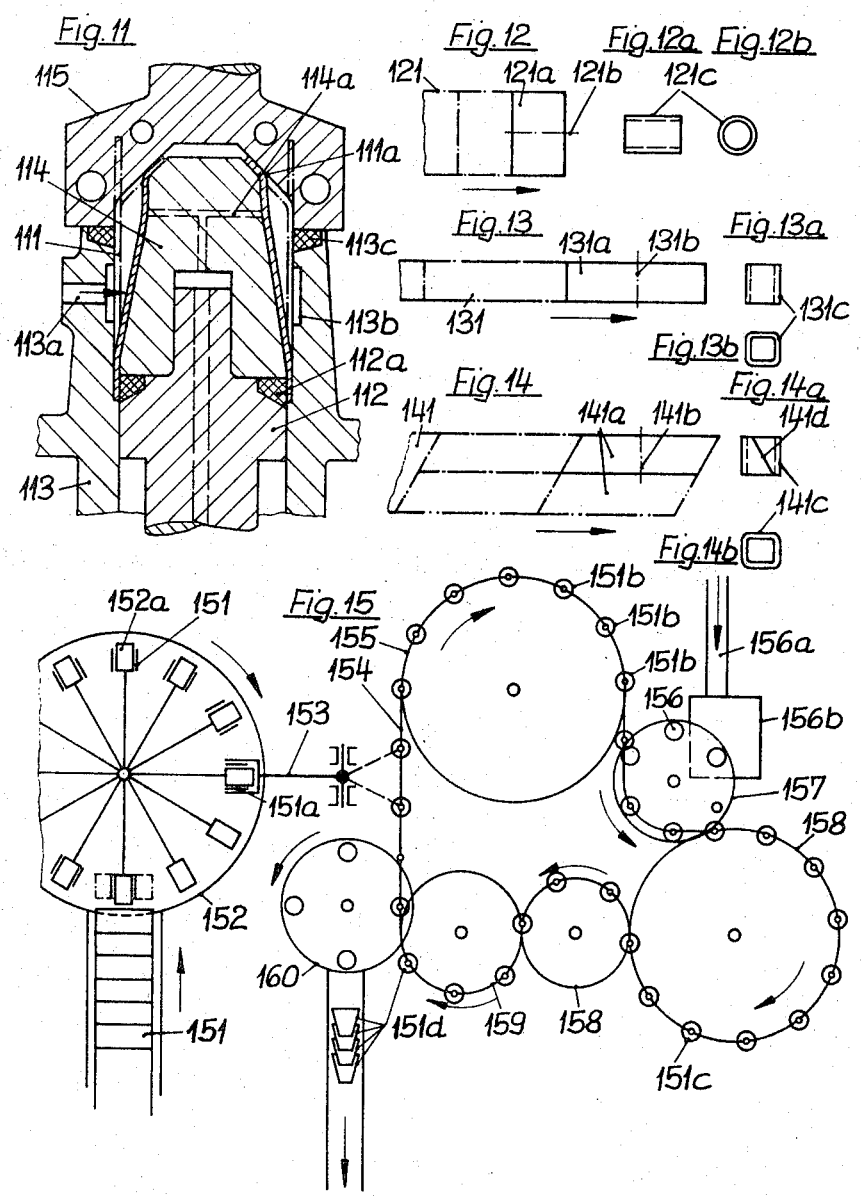

APPARATUS FOR THE MANUFACTURE OF WORK PIECES CONSTRUCTED AS CUP-LIKE, UPWARDLY OR DOWNWARDLY TAPERING CONTAINERS

The present invention relates to a method for the manufacture of work pieces constructed as preferably cup-like, upwardly or downwardly tapering containers whose walls consist of synthetic resinous material, as well as to apparatus for carrying out this method.

It is known in the prior art to manufacture cup-like containers from synthetic resinous material in that a heated-up synthetic resinous material foil is pressed into a tapering hollow shell mold by means of compressed air. During a subsequent cutting operation, the work piece is separated from the foil. Disadvantageous with this prior art method is, inter alia, that a large amount of waste results at the foil, further that it is only applicable to containers whose height does not exceed a predetermined amount in relation to the base, and in that only the completed cups can be printed with texts, for example, with trademark indications and advertising material. The printing apparatus necessary therefor are very expensive and have relatively low output and efficiency because after the printing, a certain drying time is necessary. To print already the foil is not possible because the lettering and pictures are distorted strongly and irregularly by the drawing operation.

It is furthermore known in the prior art to manufacture synthetic resinous material cups on an injection-molding machine. These machines are very expensive and the wall thickness of the cup has to be selected relatively thick. Furthermore, certain materials cannot be handled with this method which, however, by reason of their favorable and different behavior with respect to the filling material (liquid or paste-like food or the like) are desirable. The disadvantage that only the completed container can be printed is also present with this prior art method.

Finally, it is also known in the prior art to manufacture cup-like containers from synthetic resinous material by blowing. In connection therewith, initially cylindrical tubes are made from the synthetic resinous material which are then heated up, are guided through an open two-partite work tool and are separated on both sides during closing of the work tool. Thereupon, the tube is pressed by compressed air against the inner walls of the work tool having the cup shape. Disadvantageous with this prior art method is the fact that a very large amount of material waste results and that the tubes or the completed cups can be printed only subsequently.

The present invention aims at a method for the manufacture of work pieces preferably constructed as cup-like and upwardly or downwardly tapering containers whose tubes or walls consist of synthetic resinous material, and in which the shortcomings and drawbacks of the prior art processes are avoided. Furthermore, the present invention aims at providing suitable apparatus for carrying out this method.

The method according to the present invention essentially consists in that initially approximately cylindrical tubes or sleeves are wound from flat blanks and are closed, which then are formed into the tapering walls or casings. With this method according to the present invention, it is possible to manufacture very different types of container shapes and container sizes in an economic manner, and it is additionally possible to print already the foils or foil strips or the flat blanks. It is particularly advantageous in connection with this method of the present invention that it is possible to manufacture flat blanks from bands or foils completely free of waste. In that connection, it is appropriate in most cases to manufacture rectangular blanks. However, it is also possible to impart to the blanks the shape of a parallelogram, which is suited, for example, for cup shapes whose casings or walls have at least one flat lateral surface in which the connecting surfaces are to be disposed at an inclination.

Depending on the method which is utilized for the closings of the tubes or castings—the connecting surfaces of the tubes or casings can be glued or welded in different ways—and depending on the selection of the subsequent operating steps, it may be appropriate to deform the closed tubes or casings into a tapering casing prior to or after the insertion of the bottom. It is particularly advantageous to connect with each other by electric pulse welding the abutting connecting surfaces of the tube or casing and/or of the bottom with the casing. Clean and tight connecting surfaces are achieved thereby.

An advantageous embodiment of the method in accordance with the present invention resides in that the deformation of the cylindrical tubes or casings by radial expansion takes place from the inside by means of a heated work tool movable relative to the tube or casing in the longitudinal direction. However, it is also possible and may entail advantages in certain circumstances if the deformation takes place by radial compression from the outside by means of work tools movable relative to the casing in the longitudinal direction. A further advantageous embodiment of the method in accordance with the present invention essentially consists in that the deformation of the cylindrical casing takes place by hot compressed air. It is, for example, possible without difficulty by this method to produce cups whose walls or casings taper upwardly or downwardly.

Advantageous constructions of the apparatus for carrying out the method in accordance with the present invention result if work tools for the winding and closing of approximately cylindrical tubes or casings from flat blanks and for the deformation of these casings are provided, and if the work tool for the expanding or compressing of the cylindrical casings is a mandrel or hollow mandrel movable in the longitudinal direction of the casing which includes at least two separate heating zones. It is thereby possible, for example, to heat up particularly strongly the tube or casing during deformation by means of the forward, initially operating part of the mandrel. Furthermore, it is advantageous to construct the work tool for the compressing of the casing as hollow mandrel and to provide a further support mandrel which is moved along by the hollow mandrel during its work stroke. It is assured thereby that the deformation of the casing takes place uniformly and accurately as regards shape.

With apparatus for the deformation of the tube or casing by means of hot compressed air, it is advantageous if at first an open end of the casing is deformed into a flange by a shaping die or plunger arranged at the closing work tool, which flange during the subsequent deformation of the casing is clamped in an air-tight manner by the hot compressed air between the closing work tool and the shaping work tool. A good seal is achieved thereby without special expenditures and the flange may be a part of the final shape of the container, or may facilitate a subsequent working operation, for example, the rolling of a lip. It may thereby be appropriate to press also the other open end of the casing during the deformation against the shaping work tool in an air-tight manner by means of sealing rings. These sealing rings are made appropriately from elastic material, for example, from rubber or the like, which are elastically deformed by the conical plunger for the purpose of sealing. In order to be able to manufacture cups whose walls or casings taper upwardly or downwardly, it is appropriate in further development of such apparatus to construct the forming or shaping shells at least two-partite.

With all apparatus for carrying out the method in accordance with the present invention, it may be advantageous depending on the size and shape of the container and work tool to heat or also to cool the work tools serving for the shaping operation. For example, heating is used during the beginning of the manufacturing process and after the lapse of a certain time, when the heating-up of the entire work tool becomes excessively high by reason of the heated mandrel, cooling is utilized. With a favorable selection of the sequence for further operations and corresponding work tools, it is possible to mount further work tools which additionally deform the open edge surfaces of the casings, for example, which flange over the bottom or apply lips or beads, at the work tools for the deformation of the cylindrical casings. As a result thereof, work stations and, under certain circumstances, also additional cooling zones which reduce the production or increase the cost of the apparatus, may be economized.

These and further objects, features and advantages of the present invention will become more obvious from the following description and appended claims, when taken in connection with the accompanying drawing, which shows, for purposes of illustration only, several embodiments, and wherein:

FIG. 1 is a longitudinal cross-sectional view through one embodiment of an apparatus in accordance with the present invention for expanding cylindrical tubes or casings by means of a conical mandrel and a cylindrical guide bushing, with the mandrel just inserted into the cylindrical casing;

FIG. 2 is a longitudinal cross-sectional view through the apparatus of FIG. 1 with the mandrel in the lowermost portion and the casing enlarged conically;

FIG. 3 is a transverse, cross-sectional view through a cylindrically wound tube or casing whose connecting surfaces are welded together on a winding mandrel by means of a welding die for electric pulse welding;

FIG. 4 is a longitudinal cross-sectional view, similar to FIG. 1, through a modified embodiment of an apparatus in accordance with the present invention with an additional work tool for rolling the upper edge of the conically expanded casing into a lip;

FIG. 5 is a longitudinal cross-sectional view through the lower portion of a casing conically expanded according to FIG. 2 in which a bottom is inserted from below;

FIG. 6 is a longitudinal cross-sectional view through a further modified embodiment of an apparatus in accordance with the present invention for flanging over the flange of a bottom inserted above into the conical tube or casing and for rolling over the free casing edge outwardly into a lip by means of a multi-partite support shell or die;

FIG. 6a is a partial view of a slightly modified embodiment of the upper casing edge of the casing illusjrated in FIG. 6;

FIG. 7 is a partial longitudinal cross-sectional view through another embodiment of an apparatus in accordance with the present invention for flanging over the casing about the flange of an inserted bottom and for the connection of the bottom with the casing prior to the conical expanding of the casing;

FIG. 8 is a longitudinal cross-sectional view through an apparatus in accordance with the present invention for the compressing of cylindrical tubes or casings by means of a conical hollow mandrel and a correspondingly shaped support mandrel, in which the hollow mandrel has just seized the cylindrical tube or casing from the outside;

FIG. 9 is a longitudinal cross-sectional view through the apparatus of FIG. 8 with the mandrel shown in the lower position and the casing conically compressed;

FIG. 10 is a longitudinal cross-sectional view through still another embodiment of an apparatus in accordance with the present invention for expanding cylindrical tubes or casings by means of hot compressed air, with a two-partite external die and a shaping plunger mounted at the closure work tool for forming a conical flange at the casing;

FIG. 11 is a longitudinal cross-sectional view through a further modified embodiment of an apparatus in accordance with the present invention for the compressing of cylindrical tubes or casings by means of hot compressed air against an internal die;

FIG. 12 is a view on a rectangular blank, cut without waste from a foil strip which is to be wound about a winding axis chosen in the longitudinal direction of the foil band;

FIG. 12a is an elevational view of a wound cylindrical casing made from the blank according to FIG. 12;

FIG. 12b is a plan view on the casing of FIG. 12a;

FIG. 13 is a view on a rectangular blank, cut without waste from a foil strip which is to be wound about a winding axis chosen transversely to the foil band;

FIG. 13a is an elevational view of the wound cylindrical casing with rectangular cross section made from the blank of FIG. 13;

FIG. 13b is a plan view on the casing of FIG. 13a;

FIG. 14 is a plan view on a parallelogram-shaped blank, cut without waste from a foil strip which is to be wound about an axis chosen transversely to the foil band;

FIG. 14a is an elevational view of the sound cylindrical casing with rectangular cross section made from the blank of FIG. 14;

FIG. 14b is a cross-sectional view of the rectangular casing shown in FIG. 14a.

FIG. 15 is a schematic view on an installation for a continuous manufacturing method of cup-like containers in accordance with the present invention in which starting with flat blanks, the tubes or casings are wound and closed on a turnstile and are thereupon transferred by means of a continuous conveyor to the various work stations for the manufacture of the cup-like container in accordance with the present invention.

Referring now to the drawing wherein like reference numerals are used throughout the various views to designate like parts and more particularly to FIGS. 1 and 2, the approximately cylindrically wound and closed tube or casing 1 illustrated in these figures is supported in a holding tool or die 2 in which is movably arranged under spring pressure the support plunger 3. The support plunger 3 is heated or cooled by means of a circulating liquid, depending on the prevailing requirements, flowing through the channels 3a and the hollow space 3b. The mandrel 4 serves as a forming tool whose approximately cylindrical insertion surface 4a is arranged at the plunger stem 4b. The conical portion 4c of the mandrel 4 rests interchangeably on the part 4a, 4b. Liquid also flows through this mandrel on the inside of the channels 4d. In the event this plunger only is to be heated, it may also be heated electrically. FIG. 2 illustrates the end of the deformation operation whereby the support plunger 3 has been pressed downwardly by the forming tool 4. The casing 1a has received a conical shape with short cylindrical end 1b. It is illustrated in FIG. 3 how the connecting surface 31a of a cylindrically wound casing 31 are welded together by electric pulses, and more particularly by means of the welding die 33 seated in the winding mandrel 32. A heating bar 34 presses from the outside against the connecting surface 31a during the welding operation.

In FIG. 4, the already conically deformed casing 41 is seated in the holding die 43 and is additionally supported by the external support ring 43a. At the mandrel 44 which serves as a forming tool, by means of which the casing has been expanded conically, is arranged a further work tool 45 which serves as a closing tool means, by means of which the upper edge 41a of the casing, indicated in dash and dot lines, is rolled over into a lip 41b. Also, this work tool 45 can be heated as indicated by the channels 45a.

In FIG. 5, the already deformed casing 51 rests in a holding die or fixture 52 and the bottom 56 is inserted into the casing by means of a suction piston or plunger 57. This insertion of the bottom can also still take place in the same holding die, in which the casing had also been expanded.

In FIG. 6, the conically deformed casing 61 is received in a two-partite external holding die 62. The two-partite support plunger 63 belonging thereto is interchangeable and supports the work piece, in the illustrated embodiment, during the rolling or flanging over of the upper casing edge about the flange of the bottom 66 by means of the deforming or closing work tool 64. The additional support piston 63 may be dispensed with under certain circumstances. If the upper edge 61a of the casing 61b is approximately cylindrically deformed, as indicated in FIG. 6a, then the additional support of this upper edge during its turning or flanging over about the correspondingly formed bottom 66a can take place by a downwardly extending extension (not shown) of the deforming work tool 64 or by an upwardly extending extension (not shown) of the two-partite support work tool 62. If provision is made in the over-all tool according to FIG. 6 that the bottom 66 is initially inserted into the expanded casing and is flanged over, before the work tool 67 for the rolling over of the lip 61b is applied, then the bottom 66 can be supported also by an additional support plunger or piston 68 indicated in dash and dot lines.

In FIG. 7, the bottom 76 is inserted into the cylindrical casing 71 and the lower edge of the casing 71 is turned over already by means of the closing work tool 73 about the flange of the bottom 76. The work tool 77 consisting essentially of the segments 77a and of the expanding mandrel 77b connects the flanged-over bottom 76 with the casing. This connection can take place, depending on the material of the bottom, by sealing or welding.

In FIGS. 8 and 9, the hollow mandrel 84 deforms the cylindrical casing 81 by compression into a casing 81a which is conical for the most part. A support mandrel 83 is matched in its lower part to the cylindrical shape of the casing and in its upper part, to the conical shape of the deformed casing. The hollow mandrel 84 and support mandrel 83 form closing and forming tool means. The support mandrel 83 which is under spring pressure, is taken along in the downward direction during the manufacturing operation by the mandrel 84 so that the deformed casing is not able to deflect or escape inwardly in a non-permissive manner. The gap between thp mandrels 83 and 84 is approximately equal or only slightly larger than the wall thickness of the deformed casing. The channels 83a of the support mandrel 83 and the channels 84c and 84d of the mandrel 84 serve for the heating or cooling of the work tool and therewith of the work piece. The mandrel 84 consists of two parts 84a and 84b heat-insulated with respect to each other, which can be heated separately and differently strongly.

In FIG. 10, the two forming shells or shaping dies 104a and 104b are radially displaceably supported in the work tool holder 102. The approximately cylindrical tube or casing 101 is supported at its lower edge against these forming shells. The deformation begins in that the closing tool means constructed as the heated closing mandrel 105 expands the upper edge of the casing 101 in the illustrated embodiment into a conical flange 101a and presses the same against a correspondingly conical surface of the forming tool means constructed as shaping dies 104a and 104b. Approximately simultaneously the elastic sealing ring 107 consisting, for example, of rubber or the like is expanded by the conical piston end of expanding mandrel 107a so that it presses the lower edge of the casing 101 against the forming shells or dies 104a and 104b. Thereupon, hot compressed air is blown in through the channel 105a of the closing mandrel 105 which expands the casing 101 and presses the same against the forming dies 104a and 104b. Bores or the like may be provided thereby in the forming dies 104a and 104b through which the air between the work tool and the casing 101 is able to escape. After a certain period of cooling, the closing mandrel and forming dies are retracted so that the work piece can be removed.

If the work piece is to receive a shape tapering only in one direction, then the forming dies 104a and 104b can be replaced by a single shaping ring.

In FIG. 11, a cylindrical tube or casing 111 is deformed by hot compressed air in a similar manner as in FIG. 10; however, the compressed air is blown in through the channel 113a and 113b of the support cylinder 113 from the outside so that the casing receives a tapering shape which is determined by the forming tool means constructed as forming mandrel 114. The sealing ring 112a compressed between the mandrel support 112 and the forming mandrel 114 and the sealing ring 113c compressed between the support cylinder 113 and the deforming plunger 113 being about the requisite sealing during the deformation operation. The flange 111a formed at the top of the casing 111 by jhe closing tool means constructed as closing plunger 115 is clamped thereby between this closing plunger 115 and the forming mandrel 114. During the deformation, the displaced air escapes through the channels 114a which may be additionally provided with sepcial valve plugs (not shown). However, a deformation by the use of vacuum is also within the scope of the present invention.

For the embodiments of FIGS. 10 and 11, heating of the work tool parts can be done in a manner similar to that shown and described above with respect to FIGS. 4 and 8, it being noted that FIGS. 10 and 11 include unnumbered channels for conducting the heating fluids. Also, it will be understood that the cylindrical casing to be deformed in the devices of FIGS. 10 and 11 may be constructed as illustrated in FIGS. 3 and 12 to 14, and as described in the specification with respect to these Figures.

Various possibilities of the waste-free manufacture of approximately cylindrical tubes or casings are illustrated in FIGS. 12, 13 and 14. The foil strip 121 is divided transversely into rectangular, flat blanks 121a which are wound into cylinder casings 121c on a winding mandrel about an axis 121b disposed in the strip direction.

The foil strip 131 is also subdivided transversely into rectangular flat blanks 131a which are wound into approximately cylindrical rectangular casings 131c about an axis 131b disposed transversely to the strip direction.

The foil strip 141 is cut into two parallelogram-shaped flat blanks 141a disposed adjacent one another which are wound into cylindrical rectangular casings 141c on a winding mandrel about an axis 141b disposed transversely to the strip direction. The connecting surfaces 141d of these casing 141c are not disposed parallel but an inclination to the axis.

In FIG. 15, the rectangular flat blanks 151 which may already have been printed, are supplied to the continuously rotating wheel spider or turnstile-type work table 152 of conventional construction on whose cylindrical winding mandrels 152a the blanks are wound into approximately cylindrical casings and are closed in the manner described hereinabove by conventional means. The closed casings 151a are transferred by conventional means such as transfer spider 153 of conventional construction to appropriate holding fixtures of the continuously movable conveyor chain 154 both of conventional construction, and are supplied to the work stations of the work-wheel or turnstile work-table 155 where they are deformed into tapering casings 151b by means of suitable work tools as are illustrated preferably in FIGS. 1, 8, 10 and 11. These work pieces 151b are conducted on the conveyor chain 154 to a transfer wheel 157 rotating in unison therewith which inserts the bottoms 156 into the work pieces 151b in the manner described above. The bottoms 156 consisting of synthetic resinous material or of paper are punched out of a strip 156a in the work station 156b and are shaped and delivered to the transfer wheel 157. In the following work-wheel 158, the bottoms 156 are connected with the casings 151b, for example, are welded together. The thus-obtained work pieces 151c are conveyed to a work wheel 158 where the bottoms are flanged over into the casings. In the following last work wheel 159, lips or crimps are rolled into the work pieces. The completed work piece 151d is removed by a conventional removing wheel 160 out of the holding fixtures of the conveyor chain 154 and are conventionally supplied to the output track or chute.

Instead of inserting the bottoms into the casings and to connect them with the casings, after the deformation of the casings as illustrated in FIG. 15, they can also be inserted into the casings prior to the deformation thereof, i.e., for example between the transfer turnstile work-table 153 and the work wheel 155. Also, other variations of the manufacturing operation of FIG. 15 are possible. For example, in lieu of the conveyor chain 154, running through all stations, transfer wheels and transfer spiders may be arranged between the different work wheels. Furthermore, the work pieces can also be processed on oppropriately connected conveyor means. Since all of the apparatus, i.e., conveyor, transfer means, etc. not specifically described in connection with FIGS. 1 through 14 are referred to in connection with FIG. 15 are of conventional construction, known as such in the prior art and forming no part of the present invention, they have been shown only schematically in an effor to simplify the instant disclosure.

While we have shown and described several embodiments in accordance with the present invention, it is understood that the same is not limited thereto but is susceptible of numerous changes and modifications as known to a person sklled in the art, and we therefore do not wish to be limited to the details shown and described but intend to cover all such changes and modifications as are within the scope of those skilled in the art.

We claim:

1. An apparatus for carrying out the method of manufacturing work pieces preferably constructed as cup-like tapering casings from synthetic resinous material by winding flat blanks into approximately cylindrical tubes, closing the same and then deforming the same into tapering casings; said apparatus comprising work tool means operable to wind and close from flat blanks approximately cylindrical tubes, and further deforming work tool means for deforming said tubes having at least two separate heating zones and including mandrel means movable in the longitudinal direction of the tube characterized by closing tool means operable to deform at first an open end of the tube into a flange, which flange is clamped air-tight between the closing tool means and a forming tool means during subsequent deformation of the tube by hot compressed air, wherein the other open end of the casing is pressed air-tight against the forming tool means by sealing ring means during the deformation by hot compressed air.

2. An apparatus according to claim 1, wherein the work tool means operable to wind and close the tubes include electric pulse welding means for welding abutting connecting surfaces of the tubes.

3. An apparatus according to claim 1, further comprising movable conical piston means, wherein the sealing ring means is an elastic ring that for the sealing purpose is elastically deformed by the conical piston means.

4. An apparatus according to claim 3, characterized in that the forming tool means against which the casing is pressed by means of hot compressed air includes at least two radially separable forming shells.

5. An apparatus according to claim 4, wherein the forming tool means serving to impart the desired shape to the casing are heated.

6. An apparatus for carrying out the method of manufacturing work pieces preferably constructed as cup-like tapering casings from synthetic resinous material by winding flat blanks into approximately cylindrical tubes, closing the same and then deforming the same into tapering casings; said apparatus comprising work tool means operable to wind and close from flat blanks approximately cylindrical tubes, and further deforming work tool means for deforming said tubes having at least two separate heating zones and including mandrel means movable in the longitudinal direction of the tube, characterized in that a forming tool means against which the casing is pressed by means of hot compressed air includes at least two radially separable forming shells, wherein the forming tool means serving to impart the desired shape to the casing are heated.

7. An apparatus according to claim 6, wherein the work tool means operable to wind and close the tubes include electric pulse welding means for welding abutting connecting surfaces of the tubes.

8. An apparatus according to claim 24, characterized by closing tool means operable to deform at first an open end of the tube into a flange, which flange is clamped air-tight between the closing tool mean and the forming tool means during subsequent deformation of the tube by hot compressed air.

9. An apparatus according to claim 8, wherein the other open end of the casing is pressed air-tight against the forming tool means by sealing ring means during the deformation by hot compressed air.

10. An apparatus for carrying out the method of manufacturing work pieces constructed preferably as cup-like tapering containers by winding and closing approximately cylindrical tubes from flat blanks and deforming the same into tapering casings for containers, comprising:
   a. first means for continuously supplying flat blanks to a first rotating work wheel means on which the blanks are wound and closed into tubes.
   b. second means for transferring the closed tubes to a continuously operating conveyor means and for conducting the same to a second work wheel means on which the approximately cylindrical tubes are deformed into tapering casings.
   c. third means for transferring the deformed casings past a rotating transfer wheel means at which bottoms made at a separate work station are inserted into the casings, to a third work wheel means where the bottoms are connected with the casings.
   d. fourth means including work wheel means rotating with the conveyor means in which the bottoms are flanged over in the casings, and
   e. fifth means for removing the completed work pieces out of the conveyor means and supplying it to an output track.

11. An apparatus according to claim 10, wherein said fourth means includes additional means for carrying out further deformations of the work pieces.

12. An apparatus according to claim 11, wherein said further deformations include flanging over one end of the casings into a lip.

* * * * *